US007428440B2

(12) United States Patent
Schildbach et al.

(10) Patent No.: US 7,428,440 B2
(45) Date of Patent: Sep. 23, 2008

(54) METHOD AND APPARATUS FOR PRESERVING MATRIX SURROUND INFORMATION IN ENCODED AUDIO/VIDEO

(75) Inventors: Wolfgang A. Schildbach, Seattle, WA (US); Kenneth Edward Cooke, Seattle, WA (US)

(73) Assignee: RealNetWorks, Inc., Seattle, WA (US)

( * ) Notice: Subject to any disclaimer, the term of this patent is extended or adjusted under 35 U.S.C. 154(b) by 1033 days.

(21) Appl. No.: 10/295,582

(22) Filed: Nov. 14, 2002

(65) Prior Publication Data

US 2003/0231774 A1 Dec. 18, 2003

Related U.S. Application Data

(60) Provisional application No. 60/375,289, filed on Apr. 23, 2002.

(51) Int. Cl.
*G06F 17/00* (2006.01)

(52) U.S. Cl. ........................................ 700/94; 704/500

(58) Field of Classification Search .................... 381/1, 381/10, 17–23

See application file for complete search history.

(56) References Cited

U.S. PATENT DOCUMENTS

| | | | | |
|---|---|---|---|---|
| 3,836,715 | A | 9/1974 | Ito et al. | |
| 5,291,557 | A | 3/1994 | Davis et al. | |
| 5,301,237 | A | 4/1994 | Fosgate | |
| 5,583,962 | A * | 12/1996 | Davis et al. | 704/229 |
| 5,701,346 | A * | 12/1997 | Herre et al. | 381/18 |
| 5,757,927 | A * | 5/1998 | Gerzon et al. | 381/20 |
| 6,725,258 | B1 * | 4/2004 | Bick et al. | 709/219 |
| 2002/0067834 | A1 * | 6/2002 | Shirayanagi | 381/20 |
| 2002/0076049 | A1 * | 6/2002 | Boykin et al. | 380/211 |

FOREIGN PATENT DOCUMENTS

WO WO 93/18630 9/1993

OTHER PUBLICATIONS

"Dolby Surround in the Age of Dolby Digital," Dolby Laboratories Inc., 1998, 2 pgs.

"Matrix Surround Sound." http://www.audiovideo101.com/dictionary/matrix-surround.asp, printed Oct. 15, 2002, 2 pgs.

"Information technology—Coding of moving pictures and associated audio for digital storage media at up to about 1,5 Mbit/s—," Part 3: Audio, International Standard, ISO/IEC 11172-3, 1993, pp. 1, 14-23, 35-36.

"Information technology—Generic coding of moving pictures and associated audio information—," Part 7: Advanced Audio Coding (AAC), International Standard, ISO/IEC 13818-7, 1997, pp. ii-iv, 1-6, 9-18, 45-50.

(Continued)

*Primary Examiner*—Sinh Tran
*Assistant Examiner*—Walter F Briney, III
(74) *Attorney, Agent, or Firm*—Axios Law Group; Adam L. K. Philipp

(57) ABSTRACT

A method and apparatus for preserving matrix-surround information in encoded audio/video includes a receiver operative to receive matrix-surround encoded audio signals via a modem, separate the audio signals into a frequency spectrum having discrete audio frequencies, and determine a cutoff threshold used to encode the matrix-surround encoded audio signals. The method and apparatus further includes a decoder operative to decode a first set of the audio frequencies below the determined cutoff threshold using a first matrix-surround preserving audio encoding method and to decode a second set of audio frequencies above the cutoff threshold using a second non matrix-surround preserving audio encoding method.

51 Claims, 5 Drawing Sheets

OTHER PUBLICATIONS

Meares et al., "Matrixed Surround Sound in a MPEG Digital World," 102nd Convention, Mar. 22-25, 1997, Munich Germany, An Audio Engineering Society Preprint, 10 pages.

Nielsen et al., "Perceptual Coding of Matrixed Audio Signals," 96th Convention, Feb. 26-Mar. 1, 1994, Amsterdam, An Audio Engineering Society Preprint, pp. 1-12.

* cited by examiner

METHOD AND APPARATUS FOR PRESERVING MATRIX SURROUND INFORMATION IN ENCODED AUDIO/VIDEO

RELATED APPLICATIONS

The present application claims priority to U.S. provisional patent application No. 60/375,289 filed Apr. 23, 2002 entitled "Method And Apparatus For Preserving Matrix Surround Information In Streaming Audio/Video", which is hereby fully incorporated by reference.

BACKGROUND OF THE INVENTION

1. Field of the Invention

The present invention generally relates to the field of audio/video coding and decoding. More specifically, the present invention is related to a method of preserving matrix-surround encoded sound in digitally encoded audio/video.

2. Background Information

In a psychoacoustic audio encoder, coding of low-bitrate stereophonic signals is often achieved by what is referred to as joint-stereo techniques. In its simplest form, instead of transmitting two independent channels, joint-stereo techniques transmit the sum "M" of both channels together with a coefficient "C" that determines the direction in which this signal will be presented at the decoder:

$$L_r = M^*\sin(C),\ R_r = M^*\cos(C)$$

where $L_r$ and $R_r$ are the left and right channel signals which are reconstructed in-phase with respect to one another. Typically, the audio signal is split into several audio frequency bands and one such coefficient is transmitted per group of frequency bands (e.g. to save bits over transmitting both channels because the coefficient can be heavily quantized). Although joint-stereo techniques may be well-suited for coding of low-bitrate stereophonic signals, they are not particularly well-suited for encoding matrix-surround sound signals as information (such as phase relationships) typically needed by the receiver for matrix-surround sound processing/decoding is not preserved using such joint-stereo techniques.

Matrix-surround encoding is essentially an approach to encoding surround sound in which third and sometimes fourth channels of sound are folded into the two front stereo channels and later partially decoded in a reverse operation. The center channel is decoded by using signals common to both left and right channels, whereas the surround channel is decoded by extracting the sounds with inverse waveforms.

As opposed to joint-stereo techniques, dual channel or dual-mono encoding and mid/side coding techniques do tend to preserve information needed for surround sound processing/decoding. Dual channel or dual-mono coding encodes the two input channels (i.e. left and right) as separate entities, whereas in mid/side coding, the mid (L+R) channel having a mono component and the side (L−R) channel having a phase component are encoded separately. Unfortunately however, existing surround sound preserving coding techniques are high bandwidth techniques that are not suitable for transmission over low-bitrate connections.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes a method and apparatus for compressing matrix-surround encoded audio signals in a surround sound-preserving manner for transmission to a receiver/decoder. Using the methods described herein, matrix-surround information is preserved during an audio compression process, facilitating the transmission of the matrix-surround encoded audio to a receiver/decoder, particularly over low bitrate connections.

In the description to follow, various aspects of the present invention will be described, and specific configurations will be set forth. However, the present invention may be practiced with only some or all aspects of these specific details. In other instances, well-known features are omitted or simplified in order not to obscure the present invention.

The description will be presented in terms of operations performed by a processor based device, using terms such as identifying, receiving, determining, encoding, decoding, and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are intended to be synonymous.

Overview

Figure 1:
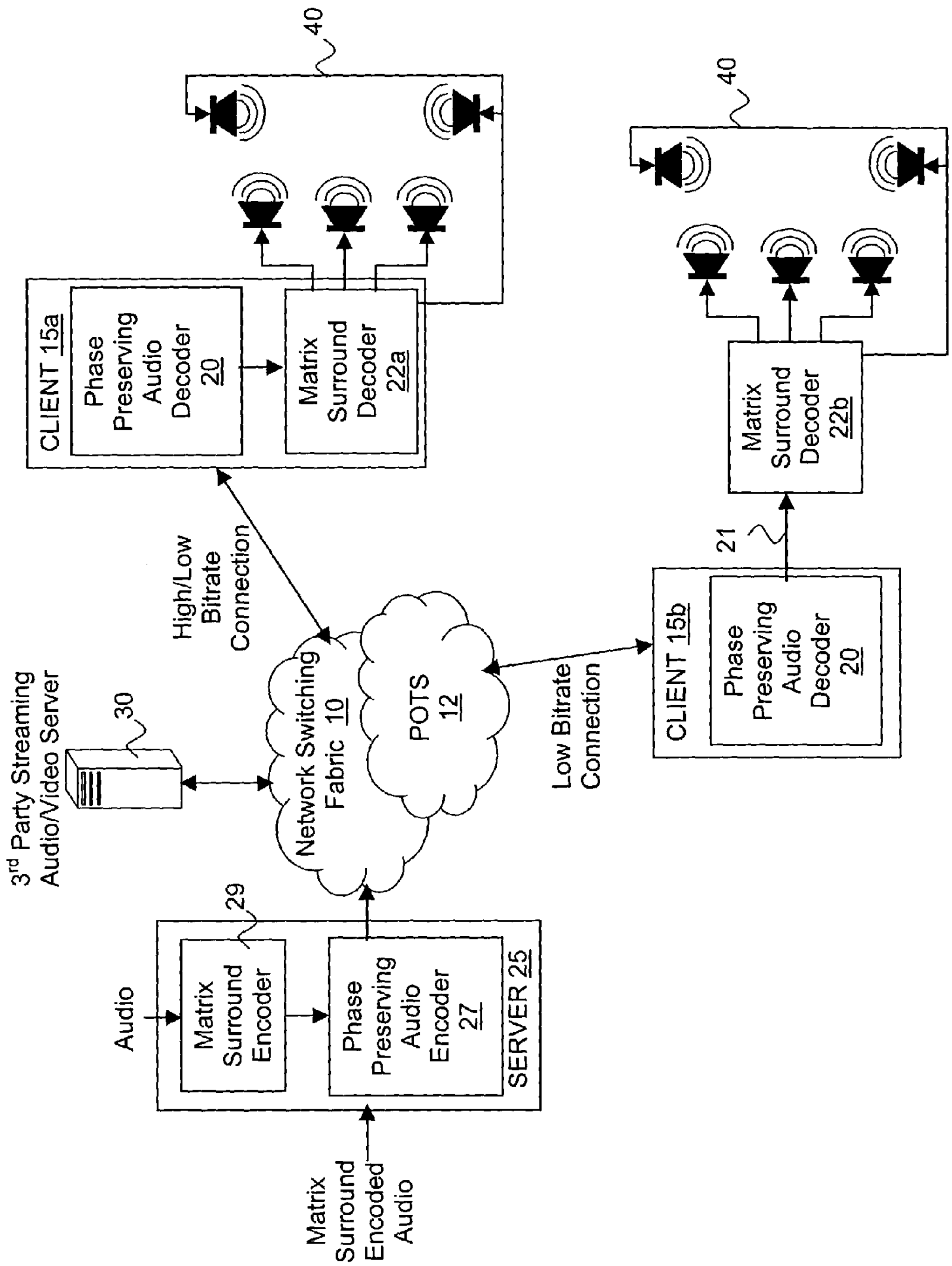
FIG. 1 illustrates an overview of the present invention in accordance with one embodiment.

FIG. 1 illustrates an overview of the present invention in accordance with one embodiment. In the illustrated embodiment, server 25 is endowed with phase-preserving audio encoding logic (hereinafter "phase-preserving encoder") 27 incorporating the teachings of the present invention. As will be described in further detail below, phase-preserving encoder 27 is equipped to encode (i.e. compress), in a phase-preserving manner, matrix-surround encoded source audio for transmission across network switching fabric 10 and/or POTS 12 to a receiving device via a low bitrate connection.

For the purposes of this description, source audio refers to any acoustic, mechanical, or electrical sound waves ranging in frequencies that may fall inside or outside of the range of human hearing. Furthermore, for the purposes of this description, a low bitrate connection may be a connection that provides data throughput rates typically falling within the 44 kbps-96 kbps range. In one embodiment, data throughput rates that do not exceed 96 kbps per second are considered low bitrate connections.

Existing surround sound processors, such as those found in preexisting audio/video equipment, typically do not reconstruct surround information within higher frequencies within the audio frequency spectrum. In accordance with one embodiment of the invention, phase-preserving encoder 27 includes logic to restrict non phase-preserving coding techniques such as joint-stereo coding, to such higher frequencies where existing surround sound processors are not known to reconstruct surround information. More specifically, in one embodiment a cutoff threshold may be identified for which audio signals having frequencies falling below the cutoff threshold are encoded with a first matrix-surround preserving algorithm such as dual-mono or mid/side coding, and audio signals having frequencies falling above the cutoff threshold are encoded with a non matrix-surround preserving algorithm such as joint-stereo coding. For the purposes of this description, the phrase "encoded with a matrix-surround preserving algorithm" refers to the method of compressing matrix-surround encoded audio such that information, such as phase relationships between the various audio channels, needed to reconstruct the matrix-surround audio at a receiver/decoder may be preserved. Likewise, the phrase "encoded with a non matrix-surround preserving algorithm" refers to the method of encoding matrix-surround encoded audio such that information needed to reconstruct the matrix-surround audio at a receiver/decoder may not be preserved. In one embodiment the cutoff threshold may be chosen to be at 7 KHz, however the cutoff threshold may be chosen based upon the nature of the source audio. For example, in audio that contains very little to no matrix-surround encoded audio, the cutoff threshold may be chosen to be at a relatively low frequency since the risk of losing matrix-surround encoded audio information is small. On the other hand, where reproduction of matrix-surround encoded audio by the decoder may be important, a higher cutoff threshold may be chosen so as to preserve a greater amount of matrix encoding information. Accordingly, matrix-surround encoded audio can be transmitted to a receiving client such as client 15*a*/15*b* over low bitrate connections without the loss of phase relationships used by receiving client to recreate the surround signal.

Server 25 may be further equipped with matrix-surround encoding logic 29 to generate matrix-surround encoded audio from e.g. three or four-channel audio before it is passed to phase-preserving encoder 27. Matrix-surround encoding logic 29 may represent any of a number of known surround sound encoders, such as DOLBY SURROUND™ and DOLBY PROLOGIC SURROUND™ available from Dolby Laboratories, Inc. of San Francisco, Calif., and as such will not be described further. Once the matrix-surround encoded audio is further encoded for transmission by phase-preserving encoder 27, server 25 transmits the encoded matrix-surround audio to a receiving device, such as clients 15*a*/15*b*, via network switching fabric 10 and/or POTS 12. In one embodiment, server 25 transmits the encoded matrix-surround audio to a receiving device in the form of a bit stream.

Network switching fabric 10 represents one or more local and/or wide area networks such as the Internet, whereas POTS 12 represents plain old telephone service facilities. In one embodiment, the matrix-surround encoded audio may be transmitted to clients 15*a*/15*b* by server 25 in response to a download request initiated by clients 15*a*/15*b*. However in other embodiments, the matrix-surround encoded audio may instead be stored by third-party server 30, which similarly receives download requests initiated by clients 15*a*/15*b*. In one embodiment, the matrix-surround encoded audio may be delivered to client 15*b* via a low bit-rate connection, such as that provided by e.g., a 56 kbps modem connection to POTS 12. In one embodiment of the invention, the matrix-surround encoded audio may be delivered to clients 15*a*/15*b* via a streaming data connection, where at least a portion of the compressed matrix surround encoded audio may be rendered at the client before all of the audio is received by the client. In one embodiment, the streaming data may be received by clients 15*a*/15*b* via at least one analog MODEM device.

Clients 15*a*/15*b* are both equipped with phase-preserving audio decoding logic (hereinafter "phase-preserving decoder") 20 incorporating the teachings of the present invention. In one embodiment of the invention, phase-preserving decoder 20 receives the compressed matrix-surround encoded audio signals (e.g. from server 25), determines the cutoff threshold used (e.g. by phase-preserving encoder 27) during the encoding process to compress the matrix-surround encoded audio signals, and decodes (i.e. decompresses) the matrix-surround encoded audio signals based upon the cutoff threshold. In one embodiment, phase-preserving decoder 20 decodes a first set of audio frequencies below the cutoff threshold using an algorithm that is complementary to the first matrix-surround preserving audio encoding algorithm, and decodes a second set of audio frequencies above the cutoff threshold using an algorithm that is complementary to the second non matrix-surround preserving audio encoding algorithm.

Once phase-preserving decoder 20 has decompressed the matrix-surround encoded audio, the resulting output signals are passed to matrix-surround decoders 22*a*/22*b* for further decoding into the original three or more discrete audio channels (e.g. as encoded by matrix-surround encoder 29 or provided to phase-preserving encoder 27) for play out by speakers 40. The matrix-surround decoder may be integrated within the receiving client, such as with the case of client 15*a*, or the matrix-surround decoder may be integrated into a separate audio/video component, such as with client 15*b*. In the event matrix-surround decoder 22 may be integrated into a separate pre-existing audio/video component, the discrete audio signals output by phase-preserving encoder 20 may be transmitted to matrix-surround decoder 22*b* via patch cables 21. Accordingly, the present invention is able to leverage upon the very large number of pre-existing consumer audio/video systems that include a matrix-surround based audio decoder, such as those capable of decoding DOLBY SURROUND™ and/or DOLBY PROLOGIC™ SURROUND encoded audio.

Figure 2:
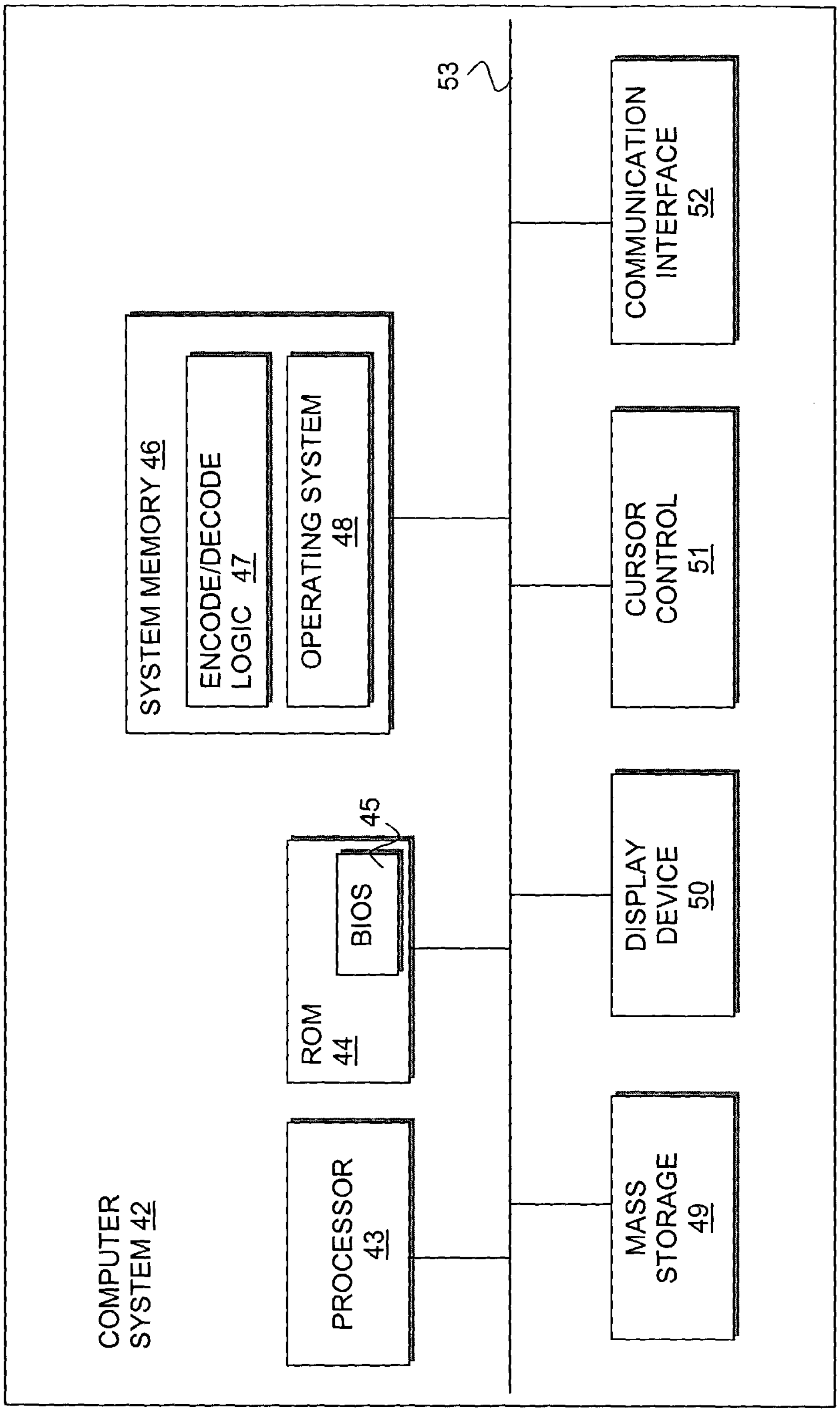
FIG. 2 illustrates one embodiment of a general-purpose computer system equipped with phase-preserving decoding facilities of the present invention.

Each of clients 15*a*/15*b* and server 25 are intended to represent a general purpose computing device which may include but is not limited to a wireless mobile phone, palm sized personal digital assistant, notebook computer, desktop computer, set-top box, game console, server, and so forth. FIG. 2 illustrates one embodiment of such a general-purpose computer system equipped with phase-preserving decoding facilities of the present invention. As shown, example computer system 42 includes processor 43, ROM 44 including basic input/output system (BIOS) 45, and system memory 46 coupled to each other via "bus" 53. Also coupled to "bus" 53 are non-volatile mass storage 49, display device 50, cursor control device 51 and communication interface 52. During operation, system memory 46 includes working copies of operating system 48 and encode/decode logic 47 of the present invention.

Except for the teachings of the present invention as incorporated herein, each of these elements is intended to represent a wide range of these devices known in the art, and otherwise performs its conventional functions. For example, processor 43 may be a processor of the Pentium® family of processors available from Intel Corporation of Santa Clara, Calif., which performs its conventional function of executing programming instructions of operating system 48 and encode/decode logic 47 of the present invention. ROM 44 may be EEPROM, Flash and the like, while memory 46 may be SDRAM, DRAM and the like, from semiconductor manufacturers such as Micron Technology of Boise, Id. Bus 53 may be a single bus or a multiple bus implementation. In other words, bus 53 may include multiple properly bridged buses of identical or different kinds, such as Local Bus, VESA, ISA, EISA, PCI and the like.

Mass storage 49 may represent disk drives, CDROMs, DVD-ROMs, DVD-RAMs and the like. Typically, mass storage 49 includes the permanent copy of operating system 48 and encode/decode logic 47. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 50 may represent any of a variety of display types including but not limited to a CRT and active/passive matrix LCD display, while cursor control 51 may represent a mouse, a touch pad, a track ball, a keyboard, and the like to facilitate user input. Communication interface 52 may represent a modem device (including but not limited to an analog/telecommunications modem, digital/cable modem, a wireless modem or any other modulator/demodulator device), an ISDN adapter, a DSL interface/modem, an Ethernet or Token ring network interface and the like.

As those skilled in the art will appreciate, the present invention may also be practiced without some of the above-enumerated elements, or with additional elements without departing from the spirit and scope of the invention.

Figure 3:
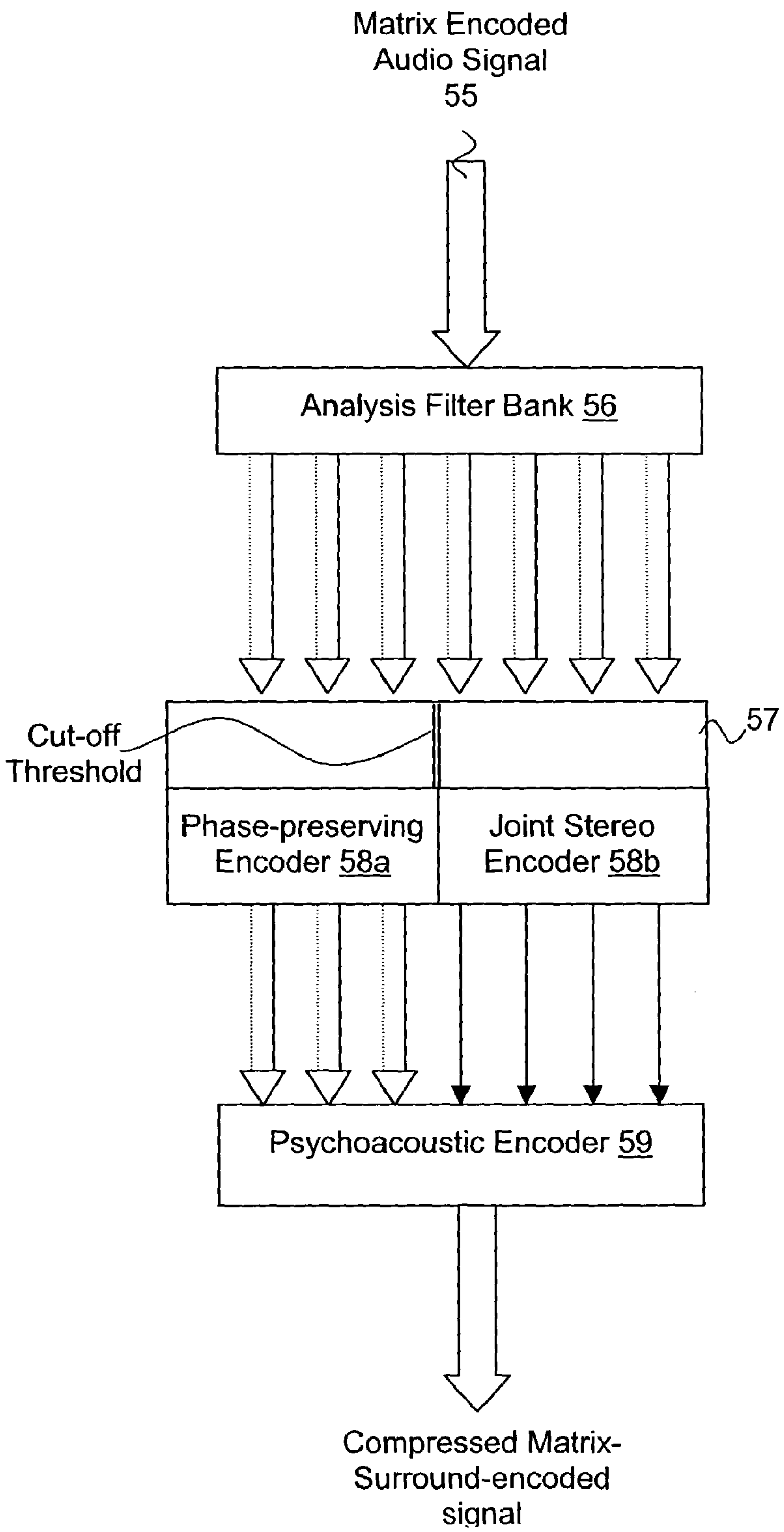
FIG. 3 illustrates a functional block diagram of one embodiment of a phase-preserving audio encoder of the present invention.

FIG. 3 is a functional illustration of one embodiment of a phase-preserving audio encoder of the present invention. As shown, full-bandwidth matrix-surround encoded audio signal 55 may be first passed through an analysis filter bank 56 to separate the matrix-surround encoded audio signal into discrete frequency bands. Next, cutoff frequency logic 57 determines a cutoff threshold identifying the lowest frequency band of the discrete frequency bands to be joint-stereo encoded cutoff. In accordance with the illustrated embodiment, audio signals having a higher frequency than that indicated by the cutoff threshold are passed through Joint Stereo encoder 58*b*, before being passed through Psychoacoustic encoder 59, whereas audio signals having frequencies falling below the cutoff threshold are passed directly or through a phase preserving processing encoder 58*a* to Psychoacoustic encoder 59. In one embodiment, a descriptor that identifies a cutoff threshold below which joint-stereo (i.e. non phase-preserving) methods are not to be applied may be transmitted from phase-preserving encoder 27 to phase-preserving decoder 20 to facilitate reproduction of the matrix-surround encoded audio at client 15*a*/15*b*. Such a descriptor may be represented by one or more bit patterns that are transmitted to phase-preserving decoder 20 in conjunction with or independent from the matrix-surround encoded audio. In one embodiment, the determination as to the cutoff threshold for which joint-stereo methods are to be applied may be made dynamically on a frame-by-frame basis. Accordingly, it may be possible to dynamically tune the audio encoding based at least in part upon the audio content. In accordance with one embodiment of the invention, the upper bound (i.e. highest single frequency or range of frequencies) of the frequency spectrum to be encoded varies in proportion to the amount the cutoff frequency varies. In one embodiment, as the cutoff frequency increases, the upper bound of the frequency spectrum to be encoded decreases. For example, if the cutoff threshold of a given frequency spectrum increases from 7 KHz to 8 KHz, the upper bound of a frequency spectrum to be encoded may decrease from 15 KHz to 12 KHZ in order to compensate for the additional surround information (i.e. that between 7 KHZ and 8 KHZ) that needs to be encoded.

Figure 4:
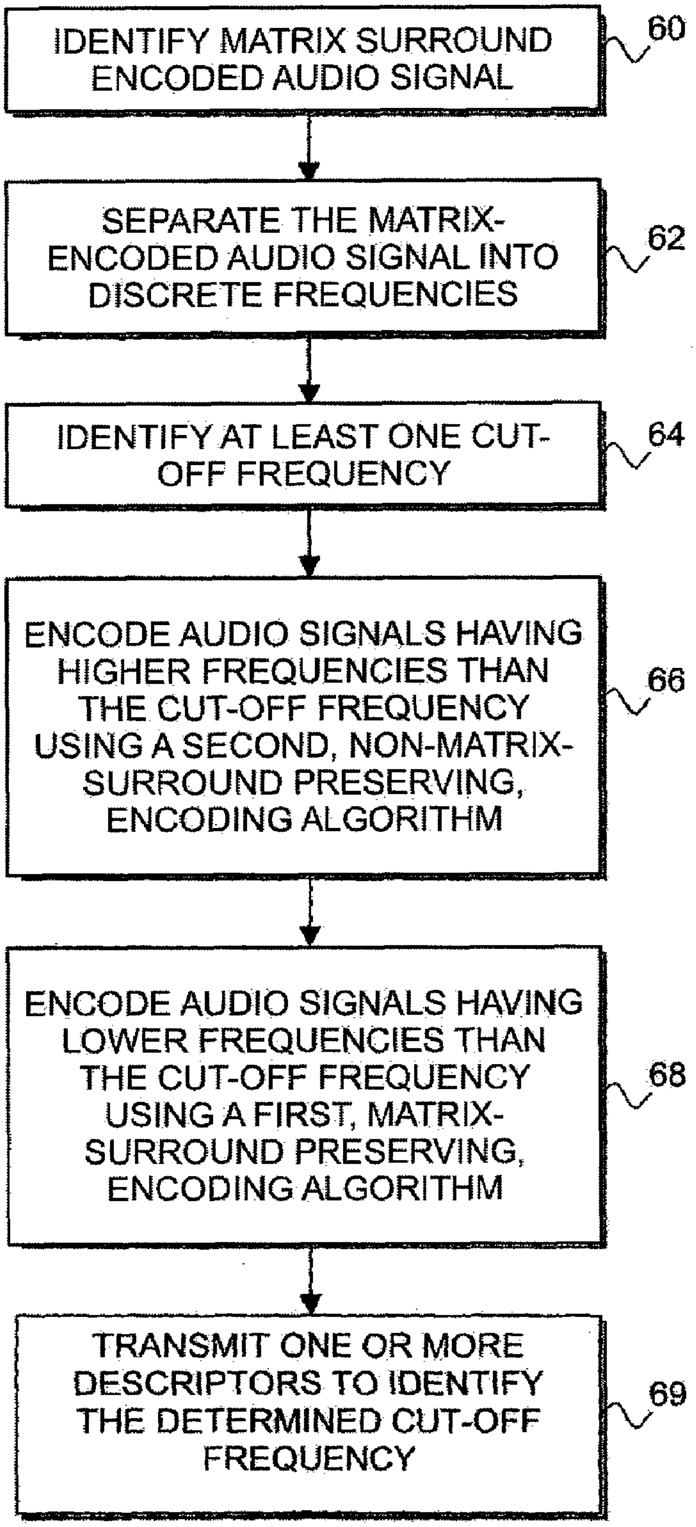
FIG. 4 illustrates an operational flow diagram of one embodiment of the matrix-surround audio coding process of the present invention.

FIG. 4 illustrates an operational flow diagram illustrating one embodiment of the matrix-surround audio coding process of the present invention. To begin, a matrix-surround encoded audio signal is first identified, block 60, and the audio signal may be separated into discrete frequency bands, block 62. Next, a cutoff threshold may be identified yielding a first group of frequencies above the cutoff frequency and a second group of frequencies below the cutoff threshold, block 64. Those audio signals having higher frequencies than that indicated by the cutoff threshold are encoded using a second non matrix-surround encoding (i.e. a non phase-preserving encoding) algorithm, block 66, whereas those audio signals having lower frequencies than that indicated by the cutoff threshold are encoded using a first matrix-surround encoding (i.e. a phase-preserving encoding) algorithm, block 68. In one embodiment, audio signals having higher frequencies than that indicated by the cutoff threshold are encoded using intensity stereo coding techniques, while audio signals having lower frequencies than that indicated by the cutoff threshold are encoded using either dual-mono or MS Coding (i.e. mid-side coding). Finally, one or more descriptors identifying the determined cutoff threshold are transmitted to the recipient along with the matrix-surround encoded audio, block 69.

Figure 5:
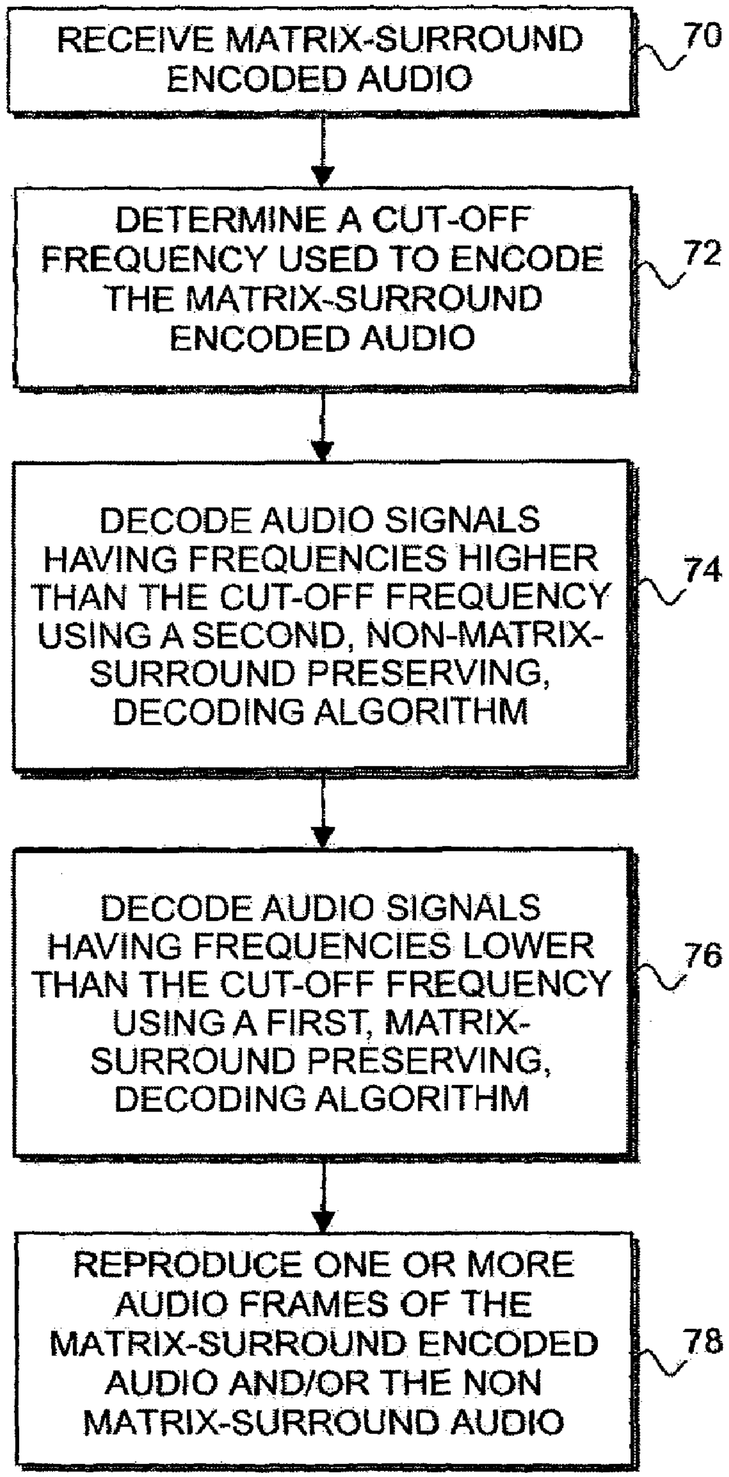
FIG. 5 illustrates an operational flow diagram of one embodiment of the matrix-surround audio decoding process of the present invention.

FIG. 5 illustrates an operational flow diagram illustrating one embodiment of the matrix-surround audio decoding process of the present invention. The process begins at block 70 with matrix-surround encoded audio being received. The cutoff threshold that was identified during the encoding process (e.g. of FIG. 3) may then be determined at block 72. In one embodiment, the cutoff threshold may be encoded within the matrix-surround encoded audio as a predetermined bit-pattern recognizable by phase-preserving decoder 20. Audio signals having higher frequencies than the cutoff threshold are then decoded using a first non matrix-surround preserving algorithm, block 74, whereas audio signals having lower frequencies than the cutoff threshold are decoded using a second matrix-surround preserving algorithm, block 76. This then facilitates the reproduction/rendering of one or more audio frames of the matrix-surround encoded audio and/or non matrix-surround encoded audio, block 78.

Epilog

While the present invention has been described in terms of the above-illustrated embodiments, those skilled in the art will recognize that the invention may not be limited to the embodiments described. The present invention can be practiced with modification and alteration within the spirit and scope of the appended claims. Thus, the description is to be regarded as illustrative instead of restrictive on the present invention.

What is claimed is:

1. A method of transmitting a matrix-surround encoded audio stream over a low bitrate connection, the bitrate being less than 96 kbps, the method comprising:

receiving a source audio stream comprising an amount of matrix surround encoded audio that varies within the stream;

separating the source audio into a frequency spectrum having a plurality of discrete audio frequencies;

identifying a cutoff threshold that varies within the stream in accordance with the varying amount of matrix surround encoded audio to distinguish which of the plurality of audio frequencies are to be encoded using a first matrix-surround preserving encoding method and which of the plurality of audio frequencies are to be encoded using a second non matrix-surround preserving encoding method;

encoding a first set of the plurality of audio frequencies below the varying cutoff threshold using the first matrix-surround preserving audio encoding method;

encoding a second set of the plurality of audio frequencies above the varying cutoff threshold using the second non matrix-surround preserving audio encoding method; and streaming the first and second sets of encoded audio to a decoder via one or more communications interfaces.

2. The method of claim 1, wherein the first matrix-surround preserving encoding method comprises a selected one of a "dual-mono" encoding method and an "MS coding" encoding method.

3. The method of claim 1, further comprising: identifying an upper bound within the frequency spectrum to determine an audio bandwidth of the transmitted audio signal.

4. The method of claim 3, wherein the audio bandwidth varies proportionally as the identified cutoff threshold varies.

5. The method of claim 1, wherein at least one of said one or more communications interfaces are analog modem connections.

6. The method of claim 1, wherein said varying cutoff threshold is identified on a frame-by-frame basis.

7. A method of encoding a matrix-surround encoded audio stream for transmission over a low bitrate connection, the bitrate being less than 96 kbps, the method comprising:

identifying a source audio stream comprising an amount of matrix surround encoded audio that varies within the stream;

separating the source audio into a frequency spectrum having a plurality of discrete audio frequencies;

identifying a cutoff threshold that varies within the stream in accordance with the varying amount of matrix surround encoded audio;

encoding a first set of the plurality of audio frequencies below the varying cutoff threshold using a first matrix-surround preserving audio encoding method; and encoding a second set of the plurality of audio frequencies above the varying cutoff threshold using a second non matrix-surround preserving audio encoding method.

8. The method of claim 7, further comprising: transmitting the first and second sets of encoded audio to a client device over the low bitrate connection.

9. The method of claim 8, wherein the bitrate of the low bitrate connection falls within the range of 44 kbps-96 kbps.

10. The method of claim 8, wherein the first and second sets of encoded audio are transmitted to the client device in association with one or more descriptors to facilitate identification of the cutoff threshold by the client device.

11. The method of claim 8, wherein the first and second sets of encoded audio are streamed to a decoder via one or more analog modem connections.

12. The method of claim 7, wherein the cutoff threshold corresponds to a 7 KHz audio frequency.

13. The method of claim 7, wherein the first matrix-surround preserving encoding method comprises a selected one of a "dual-mono" encoding method and an "MS coding" encoding method.

14. The method of claim 7, further comprising: identifying an upper bound within the frequency spectrum to determine an audio bandwidth of the transmitted audio signal.

15. The method of claim 14, wherein the audio bandwidth varies proportionally as the identified cutoff threshold varies.

16. The method of claim 7, wherein said varying cutoff threshold is identified on a frame-by-frame basis.

17. In a client device, a method of decoding a matrix-surround encoded audio bit stream transmitted over a low bitrate connection, the bitrate being less than 96 kbps, the method comprising:

receiving a bit stream comprising an amount of matrix surround encoded audio that varies within the stream;

decoding the bit stream into a frequency spectrum having a plurality of discrete audio frequencies;

determining a cutoff threshold that varies within the stream in accordance with the varying amount of matrix surround encoded audio used to encode the matrix-surround encoded audio signals;

decoding a first set of the plurality of audio frequencies below the determined varying cutoff threshold using a first matrix-surround preserving audio decoding method; and decoding a second set of the plurality of audio frequencies above the determined varying cutoff threshold using a second non matrix-surround preserving audio decoding method.

18. The method of claim 17, wherein the bitrate of the low bitrate connection falls within the range of 44 kbps-96 kbps.

19. The method of claim 17, wherein the first and second sets of encoded audio are decoded by the client device based at least in part upon one or more descriptors transmitted in association with the matrix-surround encoded audio to facilitate identification of the cutoff threshold by the client device.

20. The method of claim 17, wherein the first and second sets of encoded audio are streamed to a decoder via one or more analog modem connections.

21. The method of claim 17, wherein the cutoff threshold corresponds to a 7 KHz audio frequency.

22. The method of claim 17, wherein the first matrix-surround preserving decoding method comprises a selected one of a "dual-mono" decoding method and an "MS coding" decoding method.

23. The method of claim 17, further comprising: identifying an upper bound within the frequency spectrum to determine an audio bandwidth of the transmitted audio signal.

24. The method of claim 17, wherein said varying cutoff threshold is identified on a frame-by-frame basis.

25. A computer readable medium including a plurality of instructions stored thereon, the instructions, which when executed by a processor, are operative to cause a computing device to perform a method for encoding matrix-surround encoded audio for transmission over a low bitrate connection, the bitrate being less than 96 kbps, the method comprising:

identifying a source audio stream comprising an amount of matrix surround encoded audio that varies within the stream;

separating the source audio into a frequency spectrum having a plurality of discrete audio frequencies;

identifying a cutoff threshold that varies within the stream in accordance with the varying amount of matrix surround encoded audio;

encoding a first set of the plurality of audio frequencies below the varying cutoff threshold using a first matrix-surround preserving audio encoding method;

encoding a second set of the plurality of audio frequencies above the varying cutoff threshold using a second non matrix-surround preserving audio encoding method; and transmitting the first and second sets of encoded audio to a client device over the low bitrate connection.

26. The computer readable medium of claim 25, wherein the bitrate of the low bitrate connection falls within the range of 44 kbps-96 kbps.

27. The computer readable medium of claim 25, wherein the first and second sets of encoded audio are transmitted to the client device in association with one or more descriptors to facilitate identification of the cutoff threshold by the client device.

28. The computer readable medium of claim 25, wherein the first and second sets of encoded audio are streamed to a decoder via one or more analog modem connections.

29. The computer readable medium of claim 25, wherein the cutoff threshold corresponds to a 7 KHz audio frequency.

30. The computer readable medium of claim 25, wherein the first matrix-surround preserving encoding method comprises a selected one of a "dual-mono" encoding method and an "MS coding" encoding method.

31. The computer readable medium of claim 25, wherein the method further comprises: identifying an upper bound within the frequency spectrum to determine an audio bandwidth of the transmitted audio signal.

32. The computer readable medium of claim 31, wherein the audio bandwidth varies proportionally as the identified cutoff threshold varies.

33. The method of claim 25, wherein said varying cutoff threshold is identified on a frame-by-frame basis.

34. A computer readable medium including a plurality of instructions stored thereon, the instructions, which when executed by a processor, are operative to cause a computing device to perform a method for decoding matrix-surround encoded audio transmitted over a low bitrate connection, the bitrate being less than τkbps, the method comprising:

receiving a source audio stream comprising an amount of matrix surround encoded audio that varies within the stream;

separating the source audio into a frequency spectrum having a plurality of discrete audio frequencies;

determining a cutoff threshold that varies within the stream in accordance with the varying amount of matrix surround encoded audio used to encode the matrix-surround encoded audio signals;

decoding a first set of the plurality of audio frequencies below the determined varying cutoff threshold using a first matrix-surround preserving audio decoding method;

decoding a second set of the plurality of audio frequencies above the determined varying cutoff threshold using a second non matrix-surround preserving audio decoding method; and reproducing the first and second sets of decoded audio.

35. The computer readable medium of claim 34, wherein the bitrate of the low bitrate connection falls within the range of 44 kbps-96 kbps.

36. The computer readable medium of claim 34, wherein the first and second sets of encoded audio are decoded based at least in part upon one or more descriptors received in association with the matrix-surround encoded audio to facilitate identification of the cutoff threshold.

37. The computer readable medium of claim 34, wherein said low bitrate connection comprises an analog modem connections.

38. The computer readable medium of claim 34, wherein the cutoff threshold corresponds to a 7 KHz audio frequency.

39. The computer readable medium of claim 34, wherein the first matrix-surround preserving decoding method comprises a selected one of a "dual-mono" decoding method and an "MS coding" decoding method.

40. The recordable medium of claim 34, wherein the method further comprises: identifying an upper bound within the frequency spectrum to determine an audio bandwidth of the transmitted audio signal.

41. The method of claim 34, wherein said varying cutoff threshold is identified on a frame-by-frame basis.

42. An apparatus comprising:

a processor to execute instructions;

a communication interface; and a memory device communicatively coupled to the processor and communication interface and having stored thereon a plurality of instructions, which when executed by said processor, are operative to:

receive a source audio stream comprising an amount of matrix surround encoded audio that varies within the stream via the communication interface over a low bitrate connection of less than 96 kbps;

separate the source audio into a frequency spectrum having a plurality of discrete audio frequencies;

determine a cutoff threshold that varies within the stream in accordance with the varying amount of matrix surround encoded audio used to encode the matrix-surround encoded audio signals;

decode a first set of the plurality of audio frequencies below the determined varying cutoff threshold using a first matrix-surround preserving audio decoding method; and decode a second set of the plurality of audio frequencies above the determined varying cutoff threshold using a second non matrix-surround preserving audio decoding method.

43. The apparatus of claim 42, wherein the bitrate of the low bitrate connection falls within the range of 44 kbps-96 kbps.

44. The apparatus of claim 42, wherein the first and second sets of encoded audio are decoded based at least in part upon one or more descriptors received in association with the matrix-surround encoded audio to facilitate identification of the cutoff threshold.

45. The apparatus of claim 42, wherein the cutoff threshold corresponds to a 7 KHz audio frequency.

46. The apparatus of claim 42, wherein the first matrix-surround preserving decoding method comprises a selected one of a "dual-mono" decoding method and an "MS coding" decoding method.

47. The apparatus of claim 42, wherein the method further comprises: identifying an upper bound within the frequency spectrum to determine an audio bandwidth of the transmitted audio signal.

48. An apparatus comprising:

a receiver operative to receive a source audio stream comprising an amount of matrix surround encoded audio that varies within the stream via a communication interface over a low bitrate connection of less than 96 kpbs, separate the audio signals into a frequency spectrum having a plurality of discrete audio frequencies, and determine a cutoff threshold that varies within the stream in accordance with the varying amount of matrix surround encoded audio used to encode the matrix-surround encoded audio signals; and a decoder operative to decode a first set of the plurality of audio frequencies below the determined varying cutoff threshold using a first matrix-surround preserving audio decoding method and decode a second set of the plurality of audio frequencies above the determined varying cutoff threshold using a second non matrix-surround preserving audio decoding method.

49. The apparatus of claim 48, wherein the receiver receives matrix-surround encoded audio signals via an analog modem.

50. The apparatus of claim 48, wherein the cutoff threshold used to encode the matrix-surround encoded audio signals is determined by one or more descriptors received in association with the matrix-surround encoded audio signals.

51. The method of claim 42, wherein said varying cutoff threshold is identified on a frame-by-frame basis.

* * * * *